United States Patent
Perkins et al.

(10) Patent No.: US 8,442,040 B2
(45) Date of Patent: May 14, 2013

(54) MODULAR ADAPTATION AND CONFIGURATION OF A NETWORK NODE ARCHITECTURE

(75) Inventors: Drew D. Perkins, Saratoga, CA (US); Ting-Kuang Chiang, Saratoga, CA (US); Marco E. Sosa, San Jose, CA (US); Mark Yin, Cupertino, CA (US); Edward E. Sprague, Woodside, CA (US)

(73) Assignee: Infinera Corporation, Sunnyvale, CA (US)

( * ) Notice: Subject to any disclaimer, the term of this patent is extended or adjusted under 35 U.S.C. 154(b) by 373 days.

(21) Appl. No.: 11/479,778

(22) Filed: Jun. 30, 2006

(65) Prior Publication Data

US 2007/0009262 A1    Jan. 11, 2007

Related U.S. Application Data

(60) Provisional application No. 60/695,507, filed on Jun. 30, 2005.

(51) Int. Cl.
*H04L 12/50* (2006.01)

(52) U.S. Cl.
USPC ..... 370/359; 370/360; 370/395.2; 370/395.6; 370/401; 370/410; 370/419; 370/422

(58) Field of Classification Search ............ 370/389, 370/390, 391, 392, 393, 394, 395.1, 396; 398/140, 173, 182, 202
See application file for complete search history.

(56) References Cited

U.S. PATENT DOCUMENTS

| | | | |
|---|---|---|---|
| 6,667,973 B1 | 12/2003 | Girshe | |
| 6,687,463 B1 * | 2/2004 | Hutchison et al. | 398/83 |
| 6,819,686 B1 | 11/2004 | Franngagen | |
| 2002/0044735 A1 * | 4/2002 | Dobler et al. | 385/24 |
| 2003/0063343 A1 * | 4/2003 | Pheiffer et al. | 359/110 |
| 2004/0071397 A1 * | 4/2004 | Kim | 385/24 |
| 2004/0197103 A1 * | 10/2004 | Roberts et al. | 398/159 |
| 2005/0180751 A1 * | 8/2005 | Wood et al. | 398/83 |
| 2006/0285846 A1 * | 12/2006 | Uekama et al. | 398/30 |

FOREIGN PATENT DOCUMENTS

EP    1143762 A2    10/2001
GB    2316269    2/1998

OTHER PUBLICATIONS

T. Uchiyama et al., "3-1 Broadband node technique", The Journal of the Institute of Electronics, Information and Communication Engineers, vol. 74, No. 11, Nov. 25, 1991, pp. 1161-1168.

English language translation of a Notice of Reasons for Rejection dated Jan. 25, 2011, in Japanese Patent Application No. 2008-519662.

* cited by examiner

*Primary Examiner* — Alvin Zhu

(74) *Attorney, Agent, or Firm* — North, Weber & Baugh LLP; David L. Soltz

(57) ABSTRACT

The present invention provides a system, apparatus and method for modularly adapting a network node architecture to function in one of a plurality of potential node types. The architecture includes a configurable switching element, integrated optics, and a plurality of modules that allow a "type" of node to be adapted and configured within the base architecture. The module interfaces may be optical or electrical and be used to construct various different types of nodes including regenerators, add/drop nodes, terminal nodes, and multi-way nodes using the same base architecture.

22 Claims, 8 Drawing Sheets

MODULAR ADAPTATION AND CONFIGURATION OF A NETWORK NODE ARCHITECTURE

CROSS REFERENCE TO RELATED PATENT APPLICATIONS

This application claims priority to U.S. Provisional Application Ser. No. 60/695,507, entitled "WDM Transport Node with Flexible Node Adaptation and Multiway Switching Capability," filed Jun. 30, 2005, which application is incorporated herein by reference in its entirety.

This application is related to U.S. Nonprovisional Patent Application Ser. No. 10/267,212, entitled "Digital Optical Network Architecture, filed Oct. 8, 2002; U.S. Nonprovisional Patent Application Ser. No. 10/715,947, entitled "Optical Transmission Network with Asynchronous Mapping and Demapping and Digital Wrapper Frame for the Same," filed Nov. 18, 2003; U.S. Nonprovisional Patent Application Ser. No. 11/154,455, entitled "Universal Digital Framer Architecture for Transport of Clierit Signals of any Client Payload and Format Type," filed Jun. 16, 2005, all of which are incorporated herein by reference in their entirety.

BACKGROUND

A. Technical Field

The present invention relates generally to optical networking node architectures and configurations, and more particularly, to modular adaptation of an architecture to operate as a particular type of network node within an optical system.

B. Background of the Invention

The importance of optical networking technology in today's society is well understood. Optical networks allow large amounts of information to be transmitted at high data rates across very long distances. In optical long-haul or metro-ring scenarios, multiple channels or wavelengths are multiplexed together and inserted into a fiber optic cable that spans a relatively long distance. The optical signal, comprising multiple wavelengths, propagates within the fiber optic cable until its destination is reached. This signal is demultiplexed and the individual wavelengths further processed at a destination node.

An optical network may be built using different types of wavelength division multiplexing ("WDM") architectures and/or configurations. These networks comprise multiple optical spans; each span typically having a plurality of optical links that are separated by nodes. These nodes regenerate, route, switch, aggregate or otherwise process traffic on the plurality of links.

FIG. 1 illustrates an exemplary linear or point-to-point WDM network architecture. The network includes a first terminal node 110 and a second terminal node 120 that are connected by an optical span. The terminal nodes 110, 120 have WDM interfaces and tributary interfaces. The optical span includes multiple intermediate nodes such as a bidirectional optical amplifier 130 and a regenerator node 140 and may include other nodes depending on the design of the span. Amplifier nodes re-amplify the WDM signal without any other signal correction due to signal degradation. An add/drop node 150 may be included which adds and/or drops optical channels from the span.

Optical or electrical signal originating from client equipment are received at the first termination node 110, encapsulated according to a framing encapsulation scheme, and transported onto the optical span as a WDM signal. The optical signal may be amplified, switched or otherwise processed by the intermediary nodes 130, 140, 150 until it reaches the second terminal node 120 or the intermediate add/drop node 150, depending on its destination. At the second terminal node 120, the client signals are de-encapsulated from the WDM signal and delivered to different client equipment as either an optical or electrical signal.

FIG. 2 illustrates an exemplary metro area optical ring network architecture. The metro ring contains multiple add/drop nodes 210, 260, 270 that add channels on or drop channels from the ring network. For example, a first add/drop node 210 may drop a channel(s) and transmit the channel using a tributary interface that couples the node 210 to client equipment that further processes the dropped traffic. The first add/drop node 210 may also add tributary signals from client equipment into a WDM signal.

The ring may also include optical amplifiers 220, 230 such as erbium doped fiber amplifiers ("EDFAs"), or regenerator nodes 240, 250 that regenerate and repair an optical signal using various techniques. The optical spans within a metro ring are typically shorter than long-haul spans.

FIG. 3 illustrates a multi-ring network in which a secondary ring network is coupled to a primary ring to allow network traffic to flow between the two rings. This network includes multi-way transmission switching nodes 320, 330 for connection of the secondary ring 310 to the primary ring 315. A multi-way node 320, 330 provides more than two WDM interfaces and allows for portions of the WDM signal to be forwarded to one of the other WDM interfaces and may also provide add/drop functionality. As a result, this multi-way switching node provides for switching between sites in the secondary ring 310 while switching client signals into and out of the secondary ring from and to the primary ring 315. Other different topologies are enabled by such interconnecting rings and linear topologies by the employment of this multi-way node.

The regenerator nodes 140, 240, 250 receives a multi-wavelength WDM signal from one node WDM interface, corrects for signal degradation and distortion that has occurred to the signal during transmission and forwards the corrected signal to another node WDM interface for transmission from the node. This signal correction, such as signal re-amplification (boosting signal level), signal reshaping (changing the distorted pulse shape to an ideal square pulse shape) and signal retiming (removing or otherwise reducing signal jitter and pulse positional relationship with time), is accomplished bi-directionally through the regenerator node 140, 240, 250.

The add/drop nodes 150, 210, 260, 270 receive a multi-channel optical signal and divide the signal such that a given portion of the incoming WDM signal transits the node between two different node WDM interfaces referred to as "East and West" traffic. Another portion of the incoming WDM signal may be dropped at a tributary interface and passed to a tributary interface or interfaces to client equipment. A remainder of the WDM signal may be client signals originating from client equipment and added to the WDM signal transiting the node. The add/drop node may provide additional functionality known as signal grooming in which portions of the incoming signal are rearranged to other transport wavelengths or other time slots within the wavelengths before being combined or multiplexed with the portion of the WDM signal transiting the node.

Terminal nodes 110, 120 comprise a regression case of an add/drop node requiring only a single WDM interface. At this node, the WDM signals are demultiplexed or multiplexed on the line side of the node and the individual optical signals are provided to or received from the tributary side where they are connected to the client equipment.

The regenerator nodes, add/drop nodes, and terminal nodes have separate architectures that allow each to perform its specific function. These nodes are generally designed and configured to operate exclusively as a particular type of node. As a result, a regenerator node may not be easily reconfigured to provide add/drop functionality or terminal node operations. Comparatively, a terminal node may not be easily reconfigured to operate as a regenerator node.

SUMMARY OF THE INVENTION

The present invention provides a system, apparatus and method for modularly adapting a network node architecture to function in one of a plurality of potential node types. The architecture includes a configurable switching element, and a plurality of modules, potentially having integrated optics and various types of interfaces, which allow an architectural configuration of the node to be adapted within the base architecture. The switching element may be central or distributed depending on the design of the node architecture. The module interfaces may be optical or electrical and be used to construct various different types of nodes including regenerators, add/drop nodes, terminal nodes, and multi-way nodes using the same base architecture.

A base architecture is provided that receives various types of modules in order to adapt a node to a particular architecture and function. The various functions may also be accomplished by configuring or re-configuring common modules within the base architecture. In one embodiment, this base architecture is a base chassis architecture that comprises a switching element, a backplane, and a plurality of slots in which modules may be inserted. These modules may be optical line modules that interface optically with a transmission facility network, tributary modules that interface electrically or optically with client equipment, or other types of modules that may be used to adapt a node configuration.

In various embodiment of the invention, the base architecture is designed to identify a type of module that is inserted and associate characteristics associated therewith. For example, a tributary line module may be detected by the base architecture and various characteristics of the tributary line module are then associated and used within the node system. In other various embodiments, the modules may be manually provisioned within the base architecture and/or configured accordingly.

After the modules are inserted within the base architecture, the adapted node architecture is configured to function as a particular type of node. This configuration may include defining paths between ports within the node architecture on which traffic is to be switched or otherwise processed. This configuration process may be performed automatically or manually.

The base chassis architecture minimizes the requirement for cabling or optical interfaces, resulting in a more cost effective low power design, while increasing reliability. Costs can be further decreased through other design advances such as the use of integrated photonics, making the digital nodes more affordable. Another advantage is that the node may be dynamically adapted and/or configured in real-time during actual operation of the node. This dynamic adaptation may include converting a first type of node to a second type of node without interrupting service, stopping the operation of the node and unaffected paths within the node are not disturbed. For example, a regeneration node may be converted to an add/drop node without shutting the node down during this conversion process.

Any WDM transmission path may not be unaffected by the conversion process of a node within that path because the signal re-direction occurs only within the electrical domain. As a result, a WDM path may not be disturbed as potential add/drop functionality on a regenerator node within the path is being re-configured or otherwise changed. This feature allows an optical path to be activated and/or monitored for a period of time before an add/drop circuit is provisioned or the node re-configured without prior knowledge to future node configurations.

Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
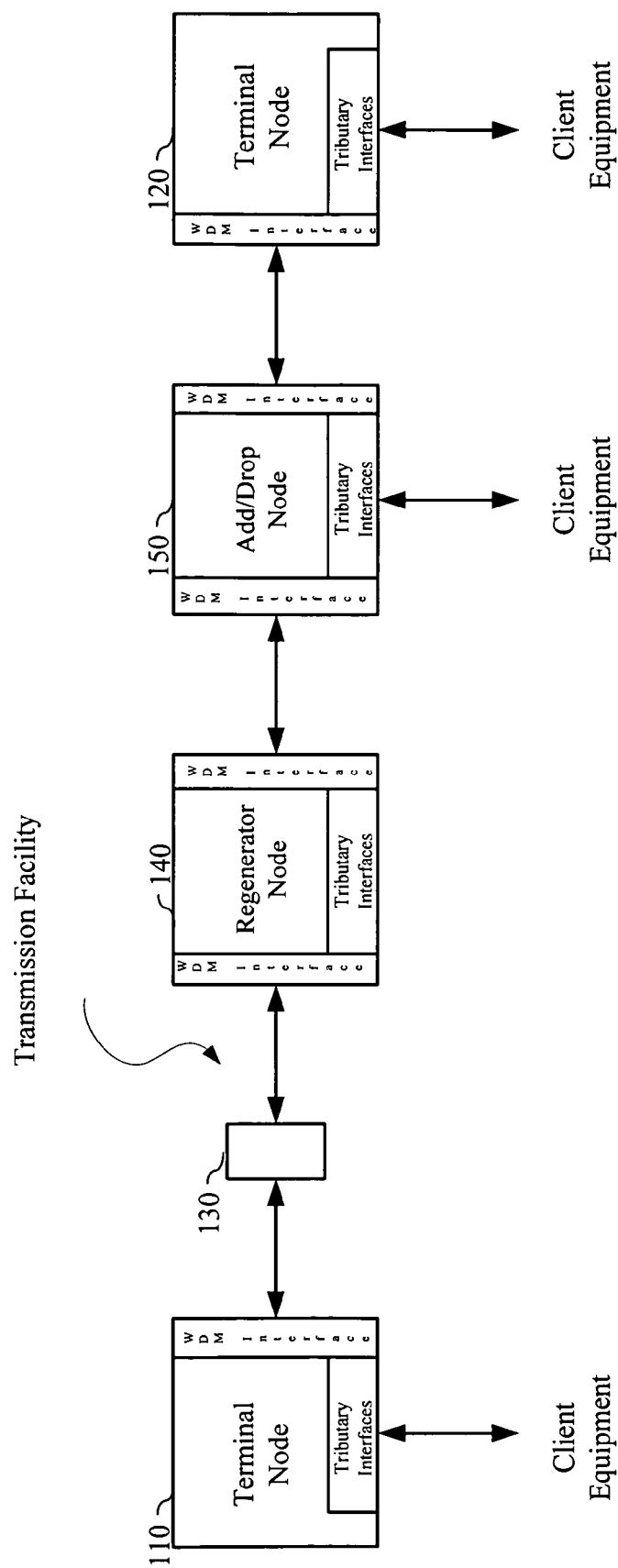
FIG. 1 illustrates an exemplary point-to-point network connection.
Figure 2:
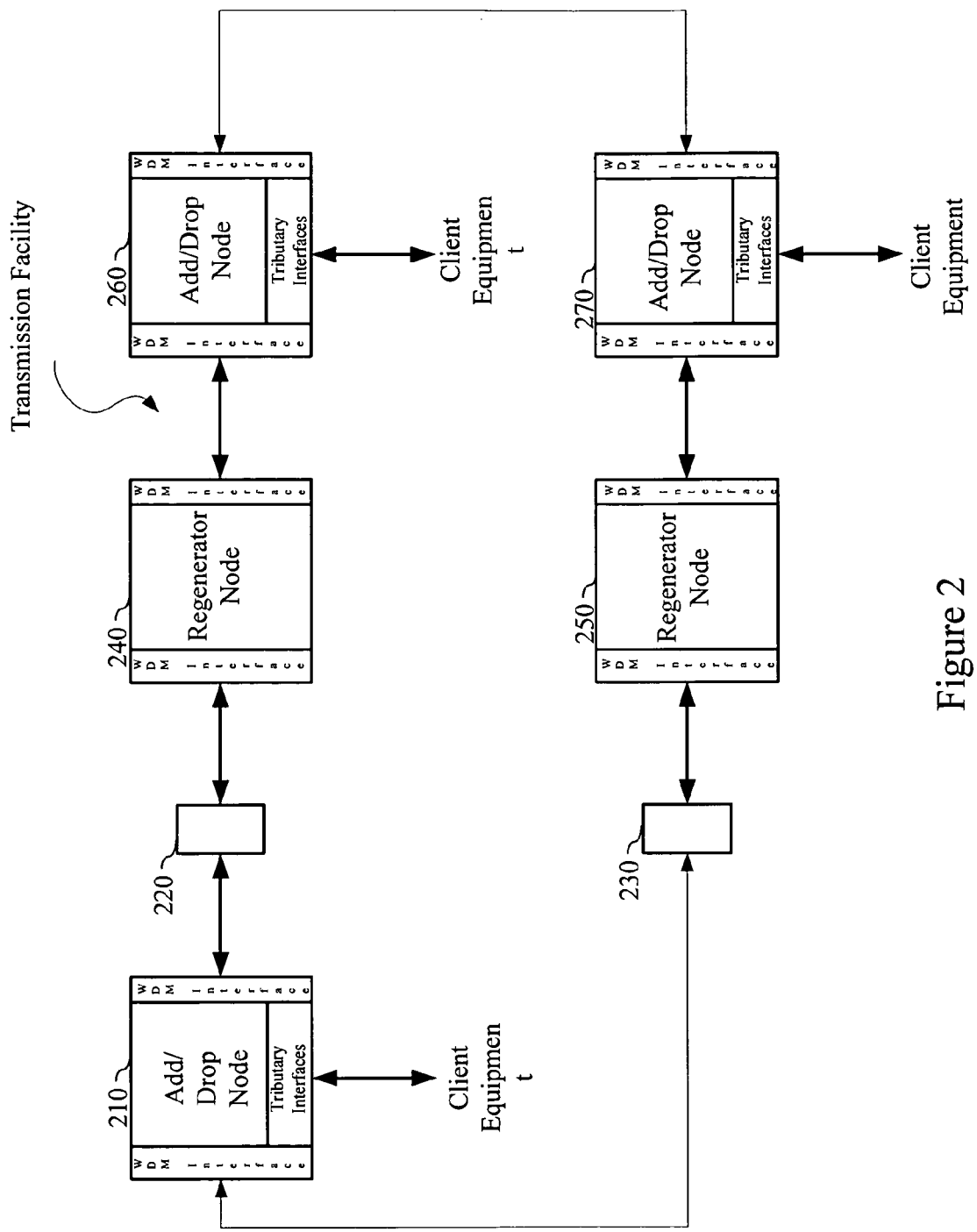
FIG. 2 illustrates an exemplary metro ring network architecture.
Figure 3:
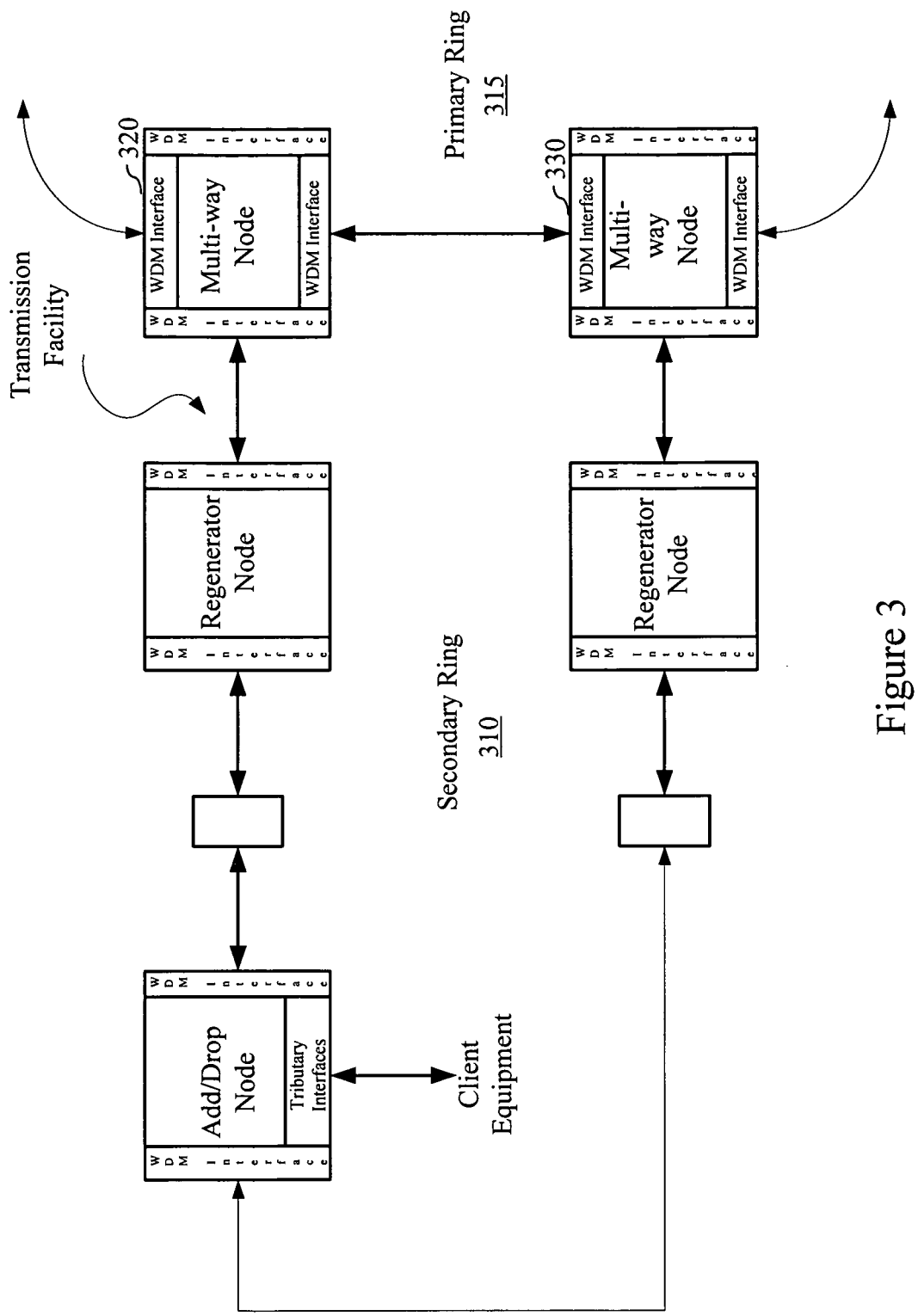
FIG. 3 illustrates an exemplary multi-way switch architecture connecting a primary ring and a secondary ring.

The present invention provides a system, apparatus and method for modularly adapting a network node architecture to function in one of a plurality of potential node types. The architecture includes a configurable switching element, and a plurality of modules, potentially having integrated optics and various types of interfaces, which allow an architectural configuration of the node to be adapted within the base architecture. The module interfaces may be optical or electrical and be used to construct various different types of nodes including regenerators, add/drop nodes, terminal nodes, and multi-way nodes using the same base architecture.

The following description is set forth for purpose of explanation in order to provide an understanding of the invention. However, it is apparent that one skilled in the art will recognize that embodiments of the present invention, some of which are described below, may be incorporated into a number of different computing systems and devices. The embodiments of the present invention may be present in hardware, software or firmware. Structures shown below in the diagram are illustrative of exemplary embodiments of the invention and are meant to avoid obscuring the invention. Furthermore, connections between components within the figures are not intended to be limited to direct connections. Rather, data between these components may be modified, re-formatted or otherwise changed by intermediary components.

Reference in the specification to "one embodiment", "in one embodiment" or "an embodiment" etc. means that a particular feature, structure, characteristic, or function described in connection with the embodiment is included in at least one embodiment of the invention. The appearances of the phrase "in one embodiment" in various places in the specification are not necessarily all referring to the same embodiment.

A. Overview

Various embodiments of the present invention provide a new transport architecture which is modular in nature to allow for the flexibility to efficiently and dynamically adapt a network node to a specific desired node configuration.

In various embodiments of the invention, the node architecture incorporates a chassis having a switching element and slots for receiving various types of line module. This modular node architecture provides for flexibility in configuration, where the node can be readily configured as an add/drop node, regenerator or multi-way node, or terminal node.

The modularity of the architecture allows commonality of design, production, purchasing and sparing by a customer. Tributary interfaces of different types can be added or removed to the node in response to customer requirements and the switching element being configured relative to the tributary interfaces as well. For example, the switching element may control the bandwidth of the data, the actual type of data which is provided to each tributary interface, and/or specific portion of the data.

The various modular node elements can be operably connected through any suitable means, such as optical or electrical cabling. However, in a preferred embodiment, the various modular node elements are operably connected to each other through the use of a chassis structure (hereinafter "base chassis architecture"), a backplane for example, with a switching element(s) being located within the chassis. The base chassis architecture may minimize the requirement for cabling or optical interfaces, resulting in a more cost effective low power design, while increasing reliability. Costs can be further decreased through other design advances such as the use of integrated photonics, making the digital nodes more affordable. Additionally, a varying number of chassis structures can be connected together, as part of the node architecture, through a hardware solution, such as a backplane, or via optical and/or electrical cabling.

The new node architecture, with the switching element connected to other modular elements, allows a control element(s) to monitor and provision the switching elements, WDM interfaces and tributary interfaces in an integrated manner. This architecture eliminates added complexity and lower reliability resulting from the use of disparate control elements in fault detection, inventory management, configuration and protection switching.

In various embodiments of the invention, the modular node architecture also provides grooming between multiple transport nodes. If required, an incoming signal can be directed to a different wavelength, and potentially a different time-slot within the wavelength on the opposite line interface. If desirable, the modular node architecture can also provide local switching or "hairpinning" of tributary to tributary connections arbitrarily. These various functions allow the modular node to operate as different types of nodes within a network depending on how the particular node is configured.

One skilled in the art will recognize that the modular node architecture allows for various types of configurations and operations. The following are examples of such configurations and are not intended to be limiting.

B. Modular Node Configurations

Figure 4:
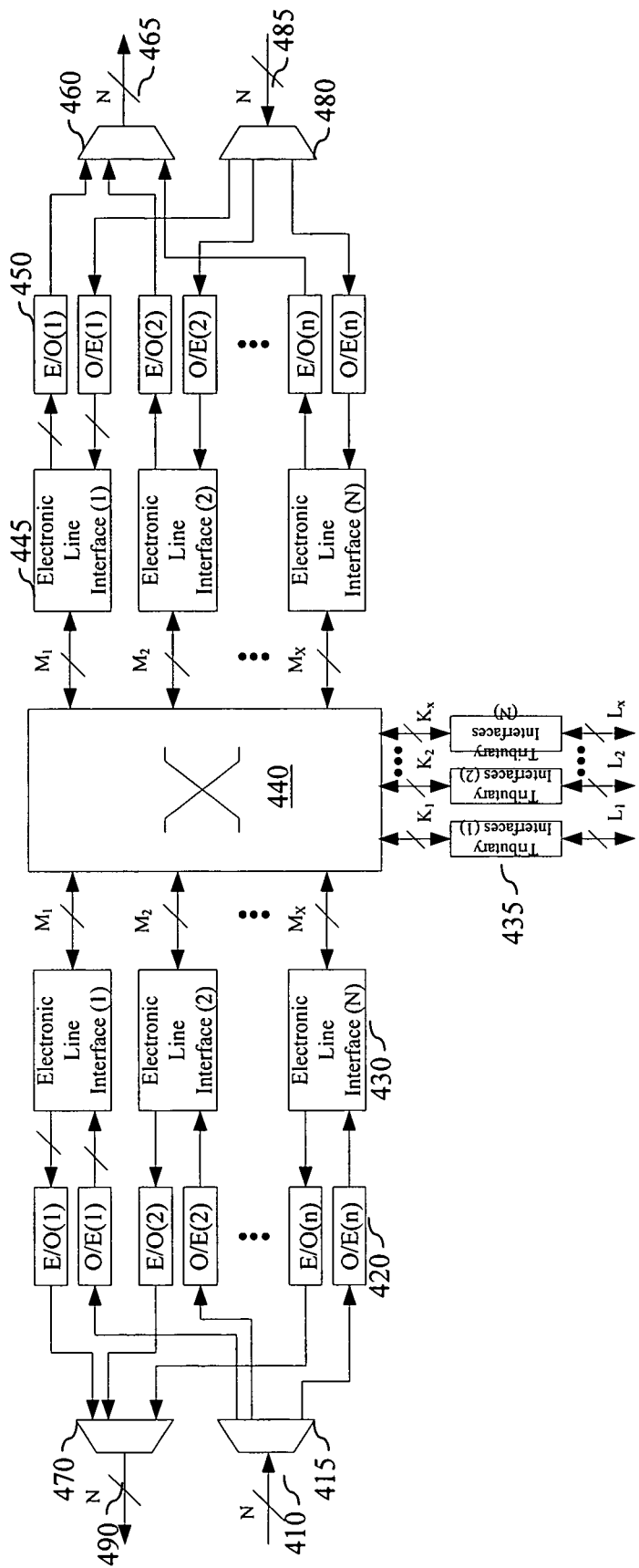
FIG. 4 illustrates a modular add/drop node architecture configuration according to various embodiment of the invention.

FIG. 4 illustrates one embodiment of invention in which the architecture is configured as an add/drop node. An add/drop node adds information to or drops information from a WDM signal; this information may be contained in multiple wavelengths and/or portions of a wavelength including time-division multiplexed and statistically multiplexed formats, and may be communicated over both optical and electrical interfaces. A switching element 440 couples to a plurality of electrical line interfaces 430, 445 and a plurality of tributary interfaces 435 that connect to client equipment. The electrical line interfaces 430, 445 are coupled to converters that convert signals between optical and electrical domains depending on the direction of the particular signal. Multiplexers 465, 470 are provided that multiplex optical channels into a WDM optical signal. Demultiplexers 410, 480 are provided that demultiplex a WDM optical signal into optical channels.

The general node architecture is adapted to operate as an add/drop node by allowing WDM and tributary interface line modules to be inserted within the base chassis architecture. The node receives the line modules and configures the system to receive and transmit network traffic on these modules. As a result, an add/drop node is created by installing the appropriate line modules within the base chassis architecture and configuring the created system to operate as an add/drop node.

Sensors and circuitry may be located within the base chassis architecture to identify certain characteristics of a module when inserted within a particular slot in the chassis. For example, tributary interface modules are detected as such when inserted within a slot and characteristics of the particular modules is identified by the system. Once the modules are inserted within the chassis, the system is able to be configured to operate as a certain type of node. An exemplary add/drop node is described in more detail below.

Node interfaces 410, 465, 485, 490 within the transmission facility optical network provides optical signals thereto and receiving optical signals therefrom (I/O signals), the optical signals being part of a data stream being transmitted across a network. Alternatively, the transmission facility could consist of a single fiber interface utilizing a bidirectional transmission scheme. The node I/O signals are electrically interfaced to a switching element, such as the cross connect 440, through N electrical-optical/optical-electrical interfaces 420, 450 and N electronic line interfaces 430, 445. The I/O signals are provided to the switching element through M electrical signals which originate in the corresponding 1 of N electronic line interfaces.

Each electrical line interface 430, 445 encapsulates/de-encapsulates the M electrical signals to/from the electrical-optical/optical-electrical interfaces 420, 450 where the number M is 1 or greater. The encapsulation may include the addition and decoding of the forward error correction ("FEC") overhead and other signal processing technologies and techniques, such as electronic dispersion compensation, to improve the signal reception. Converting serial streams into M electrical signals provides for more efficient switching and more efficient multiplexing/de-multiplexing of a given wavelength, as well as grooming on a sub-wavelength level.

The node architecture of FIG. 4 also includes K electrical signals which interface to 1 of T tributary interfaces 435. The tributary interfaces 435, in turn, provide client signals L to client equipment via an optical or electrical interface. More specifically, the tributary interface modules 435 allow some fraction of the electrical signals K to be converted to a single client interface signal L, the electrical or optical signal which is delivered to or obtained from, a different network element or signal processing equipment. Thus, there are S groups of K electrical signals (e.g. $K_1$ through $K_s$), which are provided to tributary interfaces 435 1 through T, which interfaces the signals to a client via client signals.

The tributary interface 435 can be operably connected to the switching element in any suitable means to provide for flexibility and scaling based on a client's desired application. For example, the modular tributary interfaces 435 can each be designed to provide the same number of signals K to the switching element 440 giving the client the ability to add more bandwidth by simply adding one or more additional modular tributary interfaces to the system. Alternatively, the tributary interface 435 can be interfaced to the switching element 440 via a system which can actively determine the type of tributary module upon insertion, the type defining the number of K electrical signals to interface.

The switching element 440 switches the communication traffic between the different modules including the optical network transmission facilities and the client. The switching element 440 defines and provides the signal path from any given source to any given destination within the node architecture. This allows each electrical signal M to be routed from any electronic line interface/signal to/from any other electronic line interface/signal or any tributary interface/signal.

Figure 5:
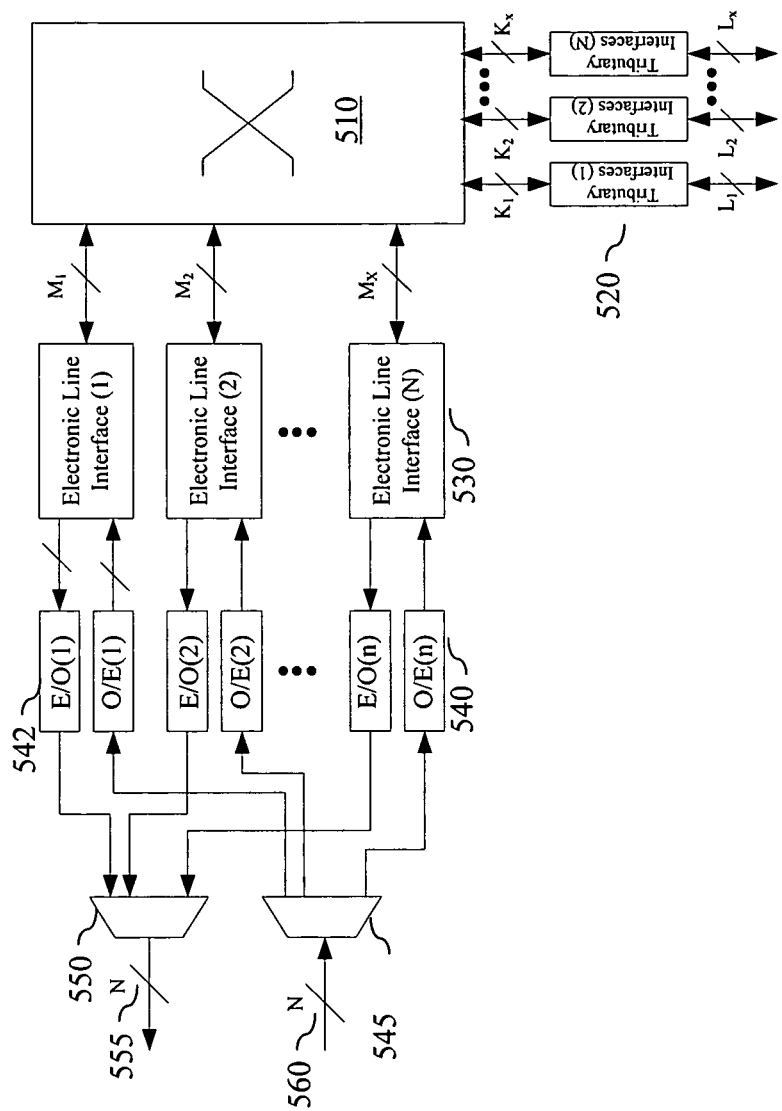
FIG. 5 illustrates a modular terminal node architecture configuration according to various embodiments of the invention.

FIG. 5 illustrates an exemplary terminal node configuration of the modular architecture node according to one embodiment of the invention. The terminal node is adapted by inserting line modules that connect to the optical transmission facility and inserting tributary line modules that connect with client equipment. The base chassis architecture receives the inserted modules and the characteristics thereof are defined, and thereby functions as a terminal node. After the modules are inserted, the architecture is configured to function as a terminal node by defining the paths on which particular network traffic will flow between the ports on the node. As previously described, this configuration process may be performed either manually or automatically.

The terminal node terminates the optical transmission facility by receiving WDM signals on one or more ports 555, 560. For incoming signals, a port 560 receives an optical signal and a demultiplexer 545 separates the channels within the WDM signal and coverts the channels into the electrical domain using an optical-to-electrical converter 540 for further processing. An electrical line interface 530 transmits the signal to a switching element 510 that switches traffic to an appropriate tributary interface 520 that is coupled to client equipment.

For outgoing signals, a client signal is received on one or more tributary interfaces 520 and communicated to the switching element 510. The switching element 510 switches this traffic to an appropriate port via an electrical interface 530 that forwards the electrical signal to an electrical-to-optical converter 542 that converts the electrical signal into the optical domain. The optical signal is multiplexed into a WDM signal by a multiplexer 550 and transmitted onto the transmission facility network via the port 555.

It is important to note that the ports 555, 560 may be bi-directional ports depending on the configuration of the terminal node.

Figure 6:
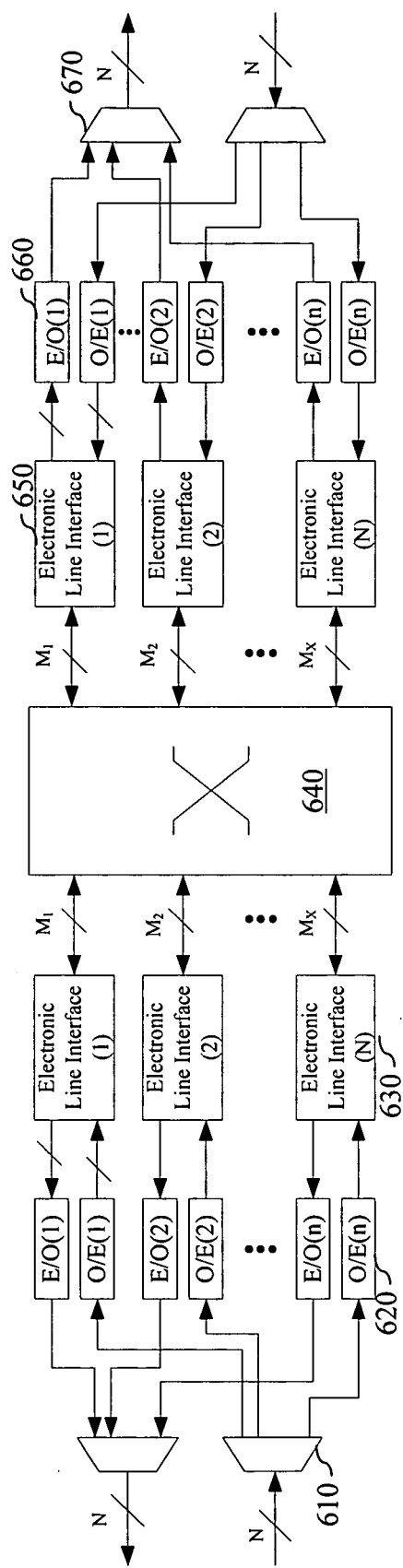
FIG. 6 illustrates a modular regeneration node architecture configuration according to various embodiments of the invention.

FIG. 6 illustrates an exemplary regeneration node configuration of the modular architecture node according to one embodiment of the invention. The regeneration node optical signals that are being transmitted on the optical transmission facility network. The regeneration node is adapted by inserting line cards that interface with the base chassis architecture which allows the adapted node to be inserted within optical transmission links.

A WDM signal is received and demultiplexed into multiple channels by a demultiplexer 610. These channels are converted into the electrical domain by an optical-to-electrical converter 620 and provided to an electrical line interface 630 which regenerates the signal which, as previously described, includes signal re-amplification, signal re-shaping, and signal re-timing, and forwards the regenerated electrical signals to the switching element 640.

The switching element 640 transmits the regenerated electrical signal to another electrical line interface 650 which sends it to an electrical-to-optical converter 660 that converts the signal into the optical domain. A multiplexer 670 multiplexes the optical channels into a WDM signal and it is further transmitted onto the optical transmission facility.

Traffic flowing in the other direction would be regenerated in a similar fashion. Additionally, ports on the regeneration node may be uni-directional or bi-directional.

Figure 7:
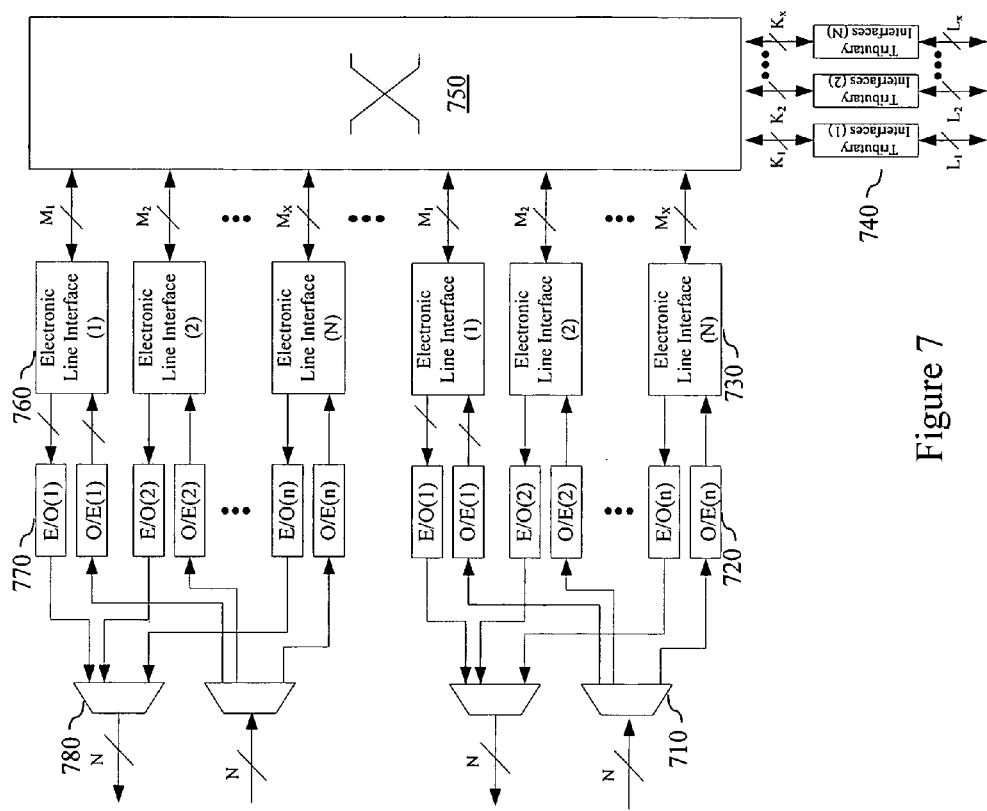
FIG. 7 illustrates a modular multi-way switching node architecture configuration according to various embodiments of the invention.

FIG. 7 illustrates an exemplary multi-way switching node configuration of the modular architecture node according to one embodiment of the invention. The multi-way switching node couples two optical rings together to allow traffic to flow between the rings. The multi-way switching node is adapted by inserting a plurality of line modules, some of which interface with a first optical ring network and other which interface with a second optical ring network. Tributary interface modules may also be installed to drop traffic to client equipment if so desired. The node is configured so that paths are defined between the various ports so that traffic is properly handled and switched between the ports. Other implementations of a multi-way node may couple more than four interfaces and may interface to linear, mesh as well as ring network architectures.

The multi-way switching node comprises P different WDM interfaces (e.g. interfaces to fiber) configured in a multi-switch arrangement. This architecture is configured with any number P interfaces by adding/removing the line/WDM modular interface blocks.

An optical signal is dropped from a first optical ring and received at an interface on the node. A demultiplexer 710 demultiplexes the WDM signal into a plurality of optical channels that are converted into the electrical domain by an optical-to-electrical converter 720. The electrical signals are provided to the switching element 750 by an electronic line interface 730.

The switching element 750 processes the electrical signals and determines whether the traffic should be switched back to the ring from which it originated, switched to another ring or switched to client equipment via the tributary interfaces 740. If the traffic is switched to another ring, then it is transmitted to another electronic line interface 760 that forwards the traffic to an electrical to optical converter 770 to convert the traffic into the optical domain. The optical signals are multiplexed 780 into a WDM signal and transmitted onto the other ring.

Figure 8:
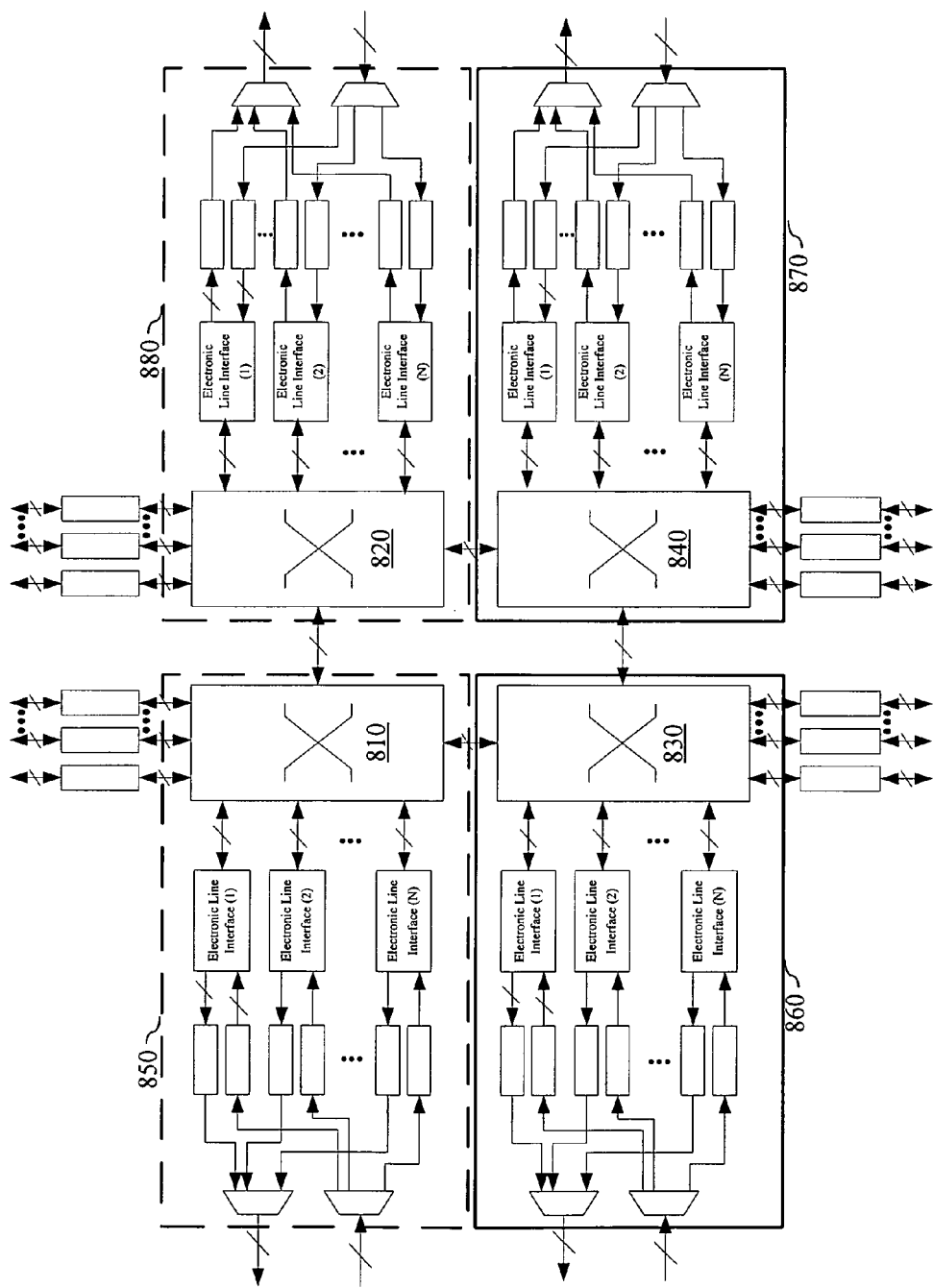
FIG. 8 illustrate another modular multi-way switching node architecture configuration according to various embodiments of the invention.

FIG. 8 illustrates another implementation of a multi-way configuration of the modular node using a distributed switching element structure according to one embodiment of the invention. The modular architecture has been partitioned such that one WDM interface and part of the switch fabric is grouped together on a line module. The line module can be removed/inserted and the switch connectivity may be changed to convert the architecture to the different node types, such as an add/drop node, a regeneration node, a terminal node, etc. As a result, the node can be modularly adapted to scale both the switch size and complexity along with the number of WDM interfaces present.

In this particular example, four distributed switching elements 810, 820, 830, 840 are coupled together and each having an associated set of line interfaces. As shown in FIG. 8, switching element 810 has a first set 850 of associated line interfaces, switching element 820 has a second set 880 of association line interfaces, switching element 830 has a third set 860 of line interfaces and switching element 840 has a fourth set 870 of line interfaces. These grouped line interfaces and switching elements allow for easier building and configuring of large multi-way switching nodes as well as more efficient scalable switching functionality as additional line modules are added.

Tributary interfaces may also be grouped together in a single removable module providing additional configurations. Also, while shown outside of the line module, it should be apparent that the tributary interfaces themselves could be part of their associated line modules.

One skilled in the art will recognize that other configurations are available for the modular node architecture. In particular, the base chassis architecture may be used to receive various combinations of modules to build and configure different types of networking nodes. As discussed above, the connections between the switching elements and the other node elements can be provided by the backbone of a chassis system. Alternatively, the switch interconnections can be made via electrical or optical cabling. Moreover, the switching elements can be provided as a separate node element or combination of switching node elements, in such case electrical or optical cabling could be used to interface the switching elements to the line interfaces. In general, the invention as described herein can utilize any network of switching elements, blocking or non-blocking.

The foregoing description of the invention has been described for purposes of clarity and understanding. It is not intended to limit the invention to the precise form disclosed. Various modifications may be possible within the scope and equivalence of the appended claims.

We claim:

1. A network node, comprising:
a switching element;
a plurality of modules, each of the plurality of modules having a corresponding one of a plurality of module types, each of the plurality of modules including an optical-electrical interface to convert optical signals to corresponding electrical signals, the plurality of modules supplying the electrical signals to the switching element;
a plurality of sensors, each of which being configured to sense the plurality of module types; and
a control element coupled to each of the plurality of modules and the switching element, said control element being configured to identify each of a plurality of paths based on the sensed plurality of module types, such that the plurality of paths extending from the first plurality of modules to the second plurality of modules via the switching element, the plurality of paths carrying traffic associated with optical signals.

2. The network node of claim 1, further comprising a base chassis having a backplane that couples the switching element with the plurality of modules.

3. The network node of claim 1, wherein the plurality of modules comprises a plurality of optical line modules.

4. The network node of claim 3, wherein each of the plurality of optical line modules comprises photonic integrated circuits.

5. The network node of claim 1, wherein the first ones of the plurality of modules comprises a first set of line modules, the second ones of the plurality of modules comprises a second set of line modules, and third ones of the plurality of modules comprises a set of tributary modules.

6. The network node of claim 1, wherein the first ones of the plurality of modules comprises a set of line modules, and the second ones of the plurality of modules comprises a set of tributary modules.

7. The network node of claim 1, wherein the first ones of the plurality of modules comprises a first set of line modules, and the second ones of the plurality of modules comprises a second set of line modules.

8. The network node of claim 1, wherein the first ones of the plurality of modules comprises a first set of line modules, the second ones of the plurality of modules comprises a second set of line modules, and third ones of the plurality of modules comprises a third set of line modules.

9. The network node of claim 8, wherein fourth ones of the plurality of modules comprises a set of tributary modules.

10. The network node of claim 8, wherein the switching element is a distributed switching element.

11. The network node of claim 1, wherein the switch element is a cross connect.

12. A method for adapting a network node, the network node including a switch circuit and a control element, the method comprising:
inserting first ones of a plurality of modules and second ones of the plurality of modules into a chassis, each of the plurality of modules having a corresponding one of a plurality of module types, each of the plurality of modules including an optical-electrical interface to convert optical signals to corresponding electrical signals, such that the electrical signals are supplied to a switching element;
sensing the plurality of module types;
identifying a plurality of paths extending through the switching element based on the sensed plurality of module types; and
supplying traffic on the plurality of paths.

13. The method of claim 12, further including the step of providing a backplane, the backplane coupling the switch circuit to the plurality of interconnects.

14. The method of claim 12, wherein the first ones of the plurality of modules comprises a set of line modules that optically couple to a transmission facility, and second ones of the plurality of modules comprises a set of tributary modules.

15. The method of claim 14, wherein third ones of the plurality of modules comprises a second set of line modules.

16. The method of claim 15, wherein fourth ones of the plurality of modules comprises a third set of line modules.

17. The method of claim 12, wherein the first ones of the plurality of modules comprises a first set of line modules, and the second ones of the plurality of modules comprises a second set of line modules.

18. The method of claim 17, wherein third ones of the plurality of the plurality of modules comprises a set of tributary modules.

19. A node, comprising:
a switching element;
first and second pluralities of sensors; and
a control element,
the node including a chassis configured to receive at least either a first plurality of modules or a second plurality of modules, each of the first and second pluralities of modules including an optical-electrical interface to convert optical signals to corresponding electrical signals, such that the plurality of electrical signals are supplied to the switching element, each of the first plurality of modules being associated with a corresponding one of a first plurality of module types, and each of the second plurality of modules being associated with a corresponding one of a second plurality of module types, such that, when the first plurality of modules is provided in the node, the first plurality of sensors identify the first plurality of module types, and when the second plurality of modules is provided in the node, the second plurality of sensors identify the second plurality of module types, the control element identifying first paths through the switching element based on the sensed first plurality of module types so that the switching element has a first configuration, and when the second plurality of modules is provided in the node, the control element identifies second paths through the switching element based on the second plurality of modules types so that the switching element has a second configuration, each of the first paths and each of the second paths extending through the switching element and being configured to transport traffic.

20. The node of claim 19, wherein the node is a regenerator node when the switching element has the first configuration, and the node is an add/drop node when the switching element has the second configuration.

21. The node of claim 19, wherein the node is a regenerator node when the switching element has the first configuration, and the node is a terminal node when the switching element has the second configuration.

22. The node of claim 19, wherein the node is a regenerator node when the switching element has the first configuration, and the node is a multi-way node when the switching element has the second configuration.

* * * * *